(12) United States Patent
Chavali et al.

(10) Patent No.: US 11,880,698 B1
(45) Date of Patent: Jan. 23, 2024

(54) SYSTEMS AND METHODS FOR ENHANCED GRAPHICAL USER INTERFACE INFORMATION TRACKING

(71) Applicant: Verizon Patent and Licensing Inc., Basking Ridge, NJ (US)

(72) Inventors: Saikiran N. Chavali, Pune (IN); Manu Bhatia, Hyderabad (IN); Prasadhini Balasubramanian, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/317,506

(22) Filed: May 15, 2023

(51) Int. Cl.
*G06F 9/451* (2018.01)

(52) U.S. Cl.
CPC .................................... *G06F 9/451* (2018.02)

(58) Field of Classification Search
None
See application file for complete search history.

(56) References Cited

U.S. PATENT DOCUMENTS

| | | | | |
|---|---|---|---|---|
| 10,523,616 | B2 * | 12/2019 | Hong | H04W 4/029 |
| 11,073,906 | B1 * | 7/2021 | Hudman | G06F 3/011 |
| 11,450,051 | B2 * | 9/2022 | Assouline | G06F 3/0488 |
| 11,481,029 | B2 * | 10/2022 | Gupta | G02B 27/0179 |
| 2010/0058213 | A1 * | 3/2010 | Higuchi | H04N 21/482 |
| | | | | 715/766 |
| 2012/0005624 | A1 * | 1/2012 | Vesely | H04N 13/383 |
| | | | | 715/808 |
| 2012/0102438 | A1 * | 4/2012 | Robinson | G06F 3/011 |
| | | | | 715/863 |
| 2012/0200600 | A1 * | 8/2012 | Demaine | G06F 3/04883 |
| | | | | 345/633 |
| 2013/0242064 | A1 * | 9/2013 | Herdy | H04N 21/44218 |
| | | | | 348/51 |
| 2016/0360187 | A1 * | 12/2016 | Smithwick | G02B 30/27 |
| 2017/0147989 | A1 * | 5/2017 | Onimaru | G08G 1/0145 |
| 2021/0039251 | A1 * | 2/2021 | Moon | G06V 20/10 |
| 2021/0248788 | A1 * | 8/2021 | Imao | G10H 1/0008 |

* cited by examiner

*Primary Examiner* — Toan H Vu

(57) ABSTRACT

In some implementations, an information tracking device may provide a graphical user interface (GUI) associated with providing contextual assistance to a user. The GUI may include a viewpoint region within a display area of the GUI. The information tracking device may track a content position that is associated with a position of content that is positioned within the viewpoint region. The information tracking device may identify a set of elements that is positioned within the viewpoint region, a set of user interactions associated with the set of elements that is positioned within the viewpoint region, and/or a time period that the content that is positioned within the viewpoint region remains positioned within the viewpoint region. The information tracking device may perform an action related to providing the contextual assistance based on at least one of the set of elements, the set of user interactions, and/or the time period.

20 Claims, 9 Drawing Sheets

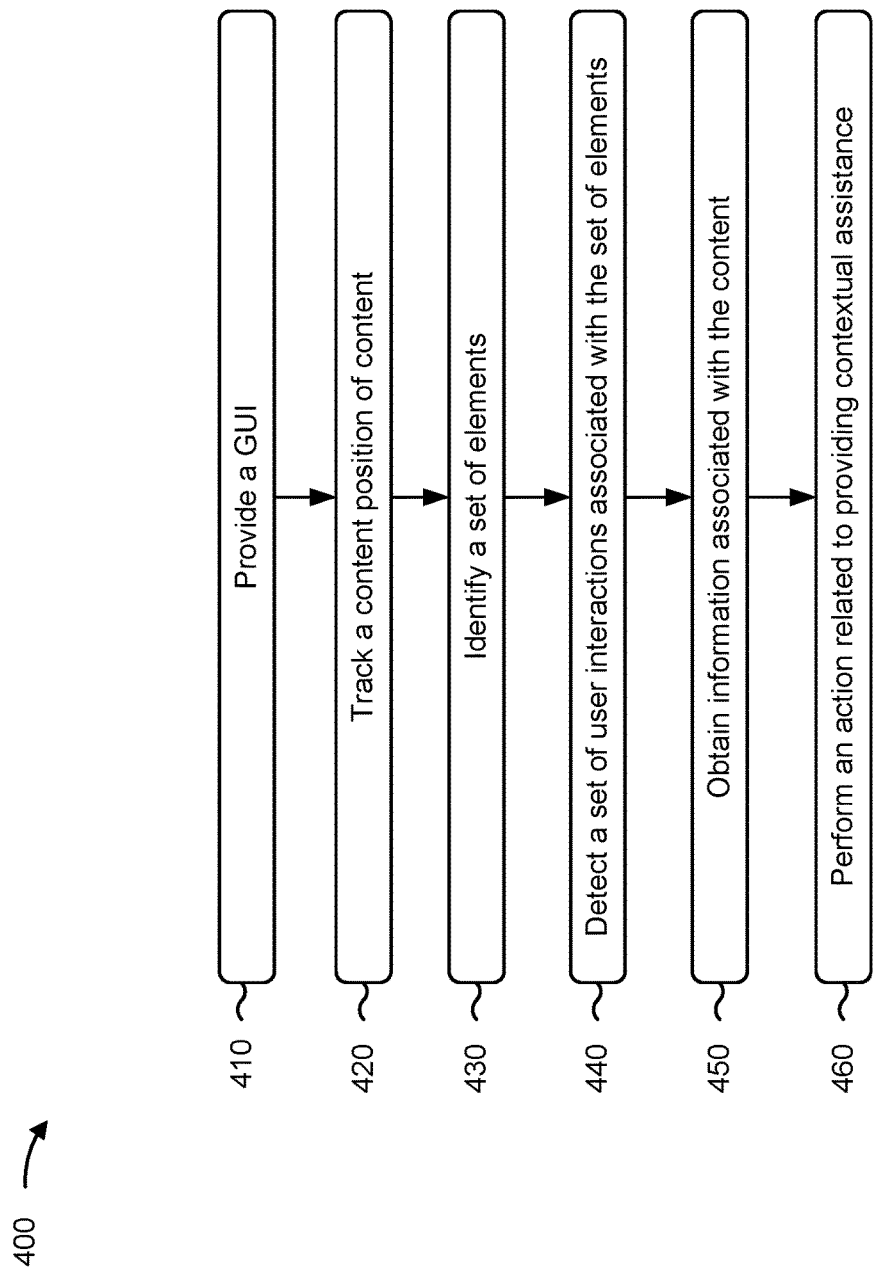

SYSTEMS AND METHODS FOR ENHANCED GRAPHICAL USER INTERFACE INFORMATION TRACKING

BACKGROUND

An information tracking system obtains and/or analyzes information, such as information associated with user interactions with a graphical user interface (GUI). For example, the information tracking system obtains information by tracking and/or monitoring user interactions with the GUI. The information tracking system analyzes the information associated with the user interactions to gain insight into various aspects, such as gaining insight into user behavior associated with the GUI and/or improvements that can be made to the GUI.

BRIEF DESCRIPTION OF THE DRAWINGS

FIG. 4 is a flowchart of an example process associated with enhanced GUI information tracking and user assistance based on the enhanced GUI information tracking.

DETAILED DESCRIPTION OF EXAMPLE EMBODIMENTS

Figure 1A:
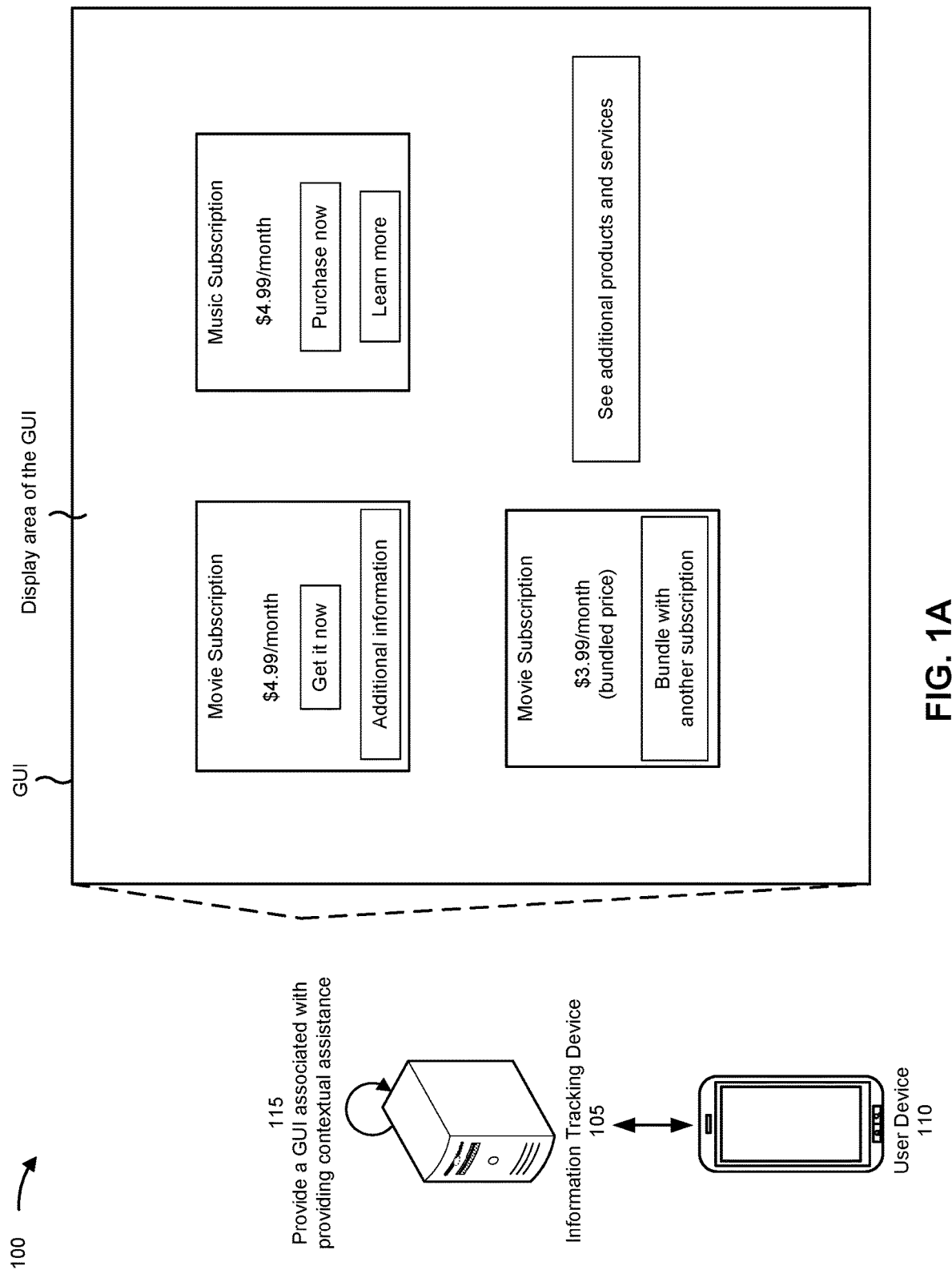
FIGS. 1A-1F are diagrams of an example associated with enhanced GUI information tracking and user assistance based on the enhanced GUI information tracking.

The following detailed description of example implementations refers to the accompanying drawings. The same reference numbers in different drawings may identify the same or similar elements.

An information tracking system may use one or more information tracking techniques to obtain information, such as user interaction information associated with user interactions with a graphical user interface (GUI). In some cases, the GUI may present (e.g., within a display area of the GUI) a web page. The web page may include elements, such as buttons, icons, menus, menu links, forms, images, and/or videos, among other examples. A user may interact with the web page via the GUI. For example, the user may visit the web page (e.g., land on the web page), click buttons, click icons, click menu links, fill out forms, click images, click videos, view videos, leave the web page (e.g., drop off of the web page), and/or perform other user interactions with the web page (e.g., via the GUI).

The information tracking system may track and/or monitor the user interactions performed by the user to obtain the user interaction information. As an example, the user interaction information may indicate a time and/or a date that the user visits the web page (e.g., based on a time and/or a date that the web page is loaded via the GUI), a time period that the user remains on the web page, a time and/or a date that the user clicks elements of the web page, a number of clicks associated with the elements, and a time and/or a date that the user leaves the web page (e.g., based on a time and/or a date that the web page is unloaded via the GUI).

The information tracking system may analyze the user interaction information to gain insights into how the user interacts with the web page, how long the user remains on the web page, and/or which elements of the web page that the user clicks. However, current information tracking systems have various drawbacks. For example, current information tracking systems are unable to provide information about a region on a web page viewed by the user (e.g., as the user browses the web page) until the user explicitly clicks on an element of the web page.

Accordingly, if the user interacts with one or more regions of a web page (e.g., browses elements of the web page that are positioned in the one or more regions of the web page, uses a mouse to scroll through the web page, and/or leaves the web page after focusing on a region of the one or more regions) without explicitly clicking on the elements, then current information tracking systems cannot determine the one or more regions that the user interacts with. Furthermore, current information tracking systems can only detect whether a user has landed on a given web page or dropped off the web page based on window events, such as load and/or unload events, which do not provide any indication related to where exactly the user dropped off and/or which location(s) or region(s) a user is focusing their attention. As a result, current information tracking systems cannot proactively assist a user based on a region that the user interacts with. For example, if the user hovers over elements (e.g., the user does not explicitly click the elements) of a web page that are positioned in a region of the web page, then current information tracking systems cannot proactively provide information associated with the elements to the user. In other words, current information tracking systems use analytics that are reactive in nature (e.g., the analytics are captured after the data is processed by backend systems associated with the current information tracking systems).

Some implementations described herein enable enhanced GUI information tracking and user assistance based on the enhanced GUI information tracking. For example, some implementations described herein relate to an information tracking system that may include an information tracking device configured to track a region of a GUI. In this way, if the user interacts with a region of the GUI, then the information tracking device may dynamically and/or proactively provide contextual assistance (e.g., based on tracking the region of the GUI) to the user, as described in more detail elsewhere herein.

In some implementations, the information tracking device may provide, during a user session, a GUI associated with providing contextual assistance to a user associated with the user session. The GUI may include a viewpoint region within a display area of the GUI (e.g., the viewpoint region may be positioned within a visible portion of the GUI). The information tracking device may track and/or monitor user interactions that are performed within the viewpoint region and/or other information associated with the viewpoint region, as described in more detail elsewhere herein.

The viewpoint region may be associated with a viewpoint of the user associated with the user (e.g., during a user session). The information tracking device may track a content position that is associated with a position of content within the viewpoint region. The information tracking device may identify, based on the content position, a set of elements positioned within the viewpoint region. The set of elements may be associated with the content that is positioned within the viewpoint region. The information tracking device may detect a set of user interactions associated with the set of elements positioned within the viewpoint region. The information tracking device may determine a time period that the content positioned within the viewpoint region remains positioned within the viewpoint region. The information tracking device may perform an action related to providing the contextual assistance to the user based on at least one of the set of elements, the set of user interactions, and/or the time period.

In some implementations, the information tracking device may, to perform the action, determine a status associated with the user (e.g., an interested status, an uninterested status, or a confused status, as described in more detail elsewhere herein), may provide information associated with at least one of the set of elements, the set of user interactions, or the time period, and/or may perform one or more operations associated with at least one of the viewpoint region and/or the set of elements.

In some implementations, the information tracking device may determine an intent associated with the user session. The information tracking device may provide, via the GUI and using an automated support agent, an intent indication. The information tracking device may determine an activity level associated with the set of elements based on the set of user interactions. The information tracking device may provide, to a server device, a data visualization based on the activity level.

In some implementations, the content position is a first content position, the set of elements is a first set of elements, the set of user interactions is a first set of user interactions, the time period is a first time period, and the action is a first action. The information tracking device may detect a movement event associated with changing the content that is positioned within the viewpoint region to changed content that is positioned within the viewpoint region. The information tracking device may track a second content position that is associated with a position of the changed content that is positioned within the viewpoint region. The information tracking device may identify, based on the content position, a second set of elements positioned within the viewpoint region. The information tracking device may detect a second set of user interactions associated with the second set of elements positioned within the viewpoint region. The information tracking device may determine a second time period that the changed content positioned within the viewpoint region remains positioned within the viewpoint region. The information tracking device may perform a second action related to providing the contextual assistance to the user based on at least one of the first set of elements, the first set of user interactions, the first time period, the second set of elements, the second set of user interactions, and/or the second time period.

In this way, some implementations described herein enable enhanced GUI information tracking and user assistance based on the enhanced GUI information tracking. For example, the information tracking system may use the information tracking device to dynamically and/or proactively provide contextual assistance (e.g., based on tracking the viewpoint region) to the user (e.g., during the user session). For example, the information tracking device can determine a region of the web page where the user performs the user interactions, can determine which elements that the user traverses as the user is browsing the web page, can determine which elements that the user does not traverse as the user is browsing, and can determine how the user navigates through the web page (e.g., because the information tracking device tracks and/or monitors user interactions that are performed within the viewpoint region).

For example, because the information tracking device is able to evaluate how the user navigates, browses, or otherwise interacts with the web page, the information tracking device has the ability to provide contextual assistance to a user (e.g., during a user session). As an example, the information tracking device may provide a contextual gliding window (e.g., to highlight elements that are positioned within the viewpoint region and enable the user to select a highlighted element via a user input). In other examples, the information tracking device may use the tracked interaction information to provide contextual animation (e.g., which is associated with providing animations associated with the viewpoint region), a contextual in-page view (e.g., which is associated with providing an in-page view associated with the viewpoint region), and/or a contextual automatically-triggered chatbot (e.g., which is associated with providing automated support, associated with the viewpoint region, to the user). Furthermore, in still other examples, the information tracking device described herein may use the tracked interaction information to enable contextual scrolling (e.g., which is associated with automatically scrolling to relevant information associated with the viewpoint region) and/or a contextual blur and read aloud operation (e.g., which is associated with blurring portions of the GUI that are positioned outside of the viewpoint region and provide an audio indication associated with the viewpoint region for output via a speaker component of the user device), among other examples, as described in more detail elsewhere herein.

FIGS. 1A-1F are diagrams of an example 100 associated with enhanced GUI information tracking and user assistance based on the enhanced GUI information tracking. As shown in FIGS. 1A-1F, example 100 includes an information tracking device 105 and a user device 110. Furthermore, in some implementations, example 100 may include a server device (not explicitly shown in FIGS. 1A-1F), as described in more detail elsewhere herein.

As shown in FIG. 1A, and by reference number 115, the information tracking device 105 may provide a GUI associated with providing contextual assistance (e.g., to a user during a user session). In some implementations, the information tracking device 105 may provide the GUI in response to detecting a trigger event (e.g., that is associated with a user). For example, the trigger event may be associated with the user utilizing the user device 110 to access a web page, to open an application (e.g., a mobile application or a native application and/or a desktop application), and/or to access a platform (e.g., associated with the GUI), among other examples.

For example, if the user utilizes the user device 110 to access a web page via a web browser (e.g., rendered via a user interface of the user device 110), then the information tracking device 105 may provide the GUI for display via the web browser (e.g., that is accessed via the user device 110). As another example, if the user utilizes the user device 110 to open an application (e.g., executing on the user device 110), then the information tracking device 105 may provide the GUI for display via the application (e.g., that is opened via the user device 110). As another example, if the user utilizes the user device 110 to access a platform (e.g., executing on the user device 110), then the information tracking device 105 may provide the GUI for display via the platform (e.g., that is opened via the user device 110). Accordingly, for example, the information tracking device 105 may initiate a user session based on providing the GUI for display via the user device 110 of the user (e.g., to provide contextual assistance to the user during the user session, as described in more detail elsewhere herein).

In some implementations, content may be displayed within the display area of the GUI. The content may include one or more elements (e.g., one or more graphical elements). For example, the one or more elements may include one or more buttons, icons, menus, menu links, forms, images, and/or videos, among other examples. As shown in FIG. 1A, the content (e.g., that is displayed via the GUI) includes multiple elements that relate to options for purchasing digital media subscriptions, although it will be appreciated that the information tracking device may be used to track interactions and/or provide user assistance for any suitable GUI. For example, the content (e.g., as shown in FIG. 1A) includes a "Movie Subscription" icon including text indicating "$4.99/month," a "Get it now" button, and an "Additional information" button.

As another example, the content (e.g., as shown in FIG. 1A) includes a "Music Subscription" icon including text indicating "$4.99/month," a "Purchase now" button, and a "Learn more" button. As another example, the content (e.g., as shown in FIG. 1A) includes a "Movie Subscription" icon associated with a discounted price, including text indicating "$3.99/month (bundled price)" and a "Bundle with another subscription" button. As another example, the content (e.g., as shown in FIG. 1A) includes a "See additional products and services" button). In some implementations, the information tracking device 105 may track and/or monitor user interactions with the GUI (e.g., user interactions associated with one or more elements, included in the content, that are presented, via the GUI, within the display area of the GUI, as described in more detail elsewhere herein).

Figure 1B:
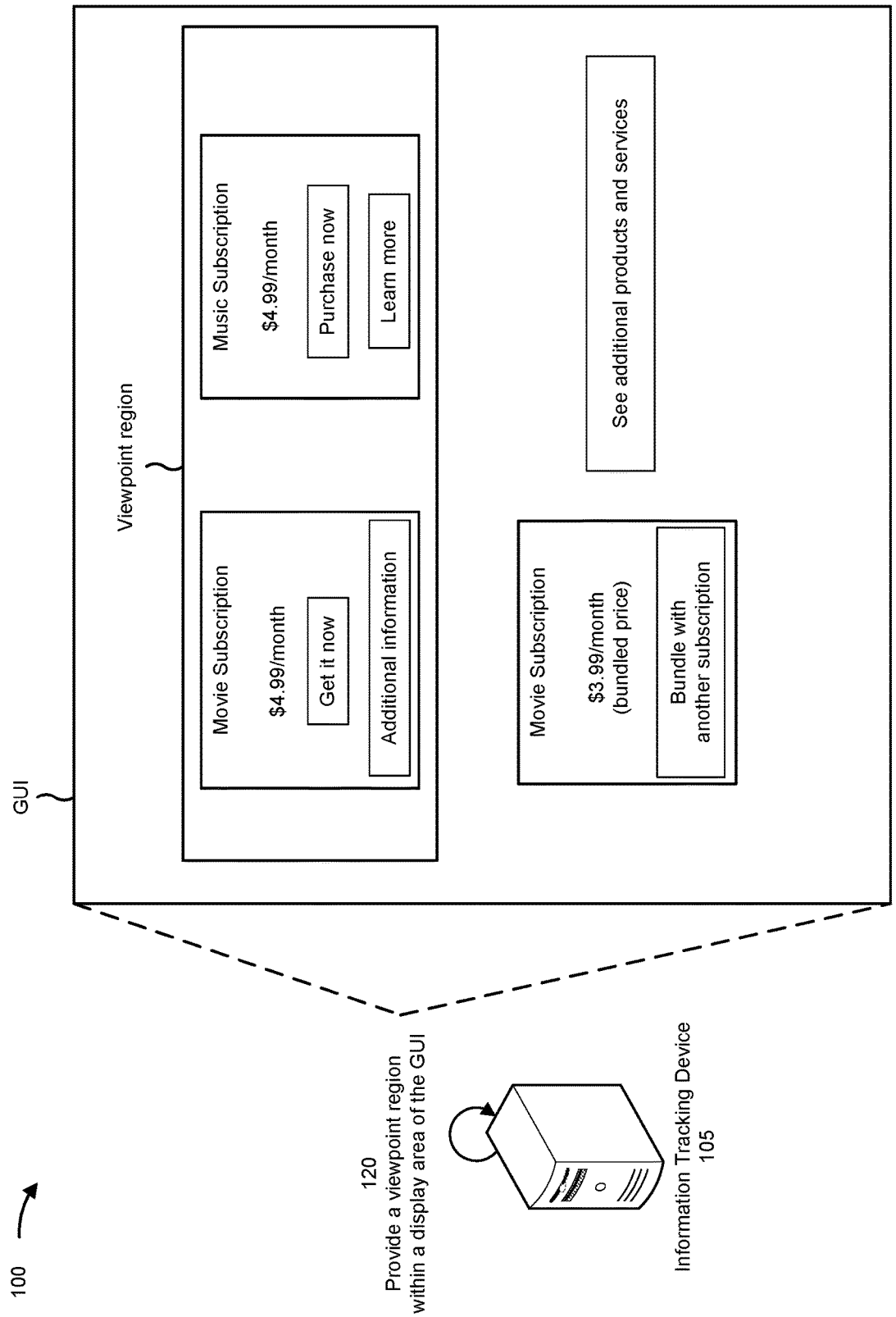

As shown in FIG. 1B, and by reference number 120, the information tracking device may provide a viewpoint region within the display area of the GUI. In some implementations, the information tracking device may provide the viewpoint region based on providing the GUI for display via the user device 110 of the user. For example, if the GUI is associated with presenting a web page, then the information tracking device 105 may provide the viewpoint region based on loading the web page for display via the user device 110.

As another example, if the GUI is associated with an application, then the GUI may provide the viewpoint region based on presenting the GUI (e.g., associated with the application) for display via the user device 110. As another example, if the GUI is associated with a platform, then the information tracking device 105 may provide the viewpoint region based on presenting the GUI (e.g., associated with the platform) for display via the user device 110.

In some implementations, the GUI may be associated with a reference system. For example, the GUI may be associated with a two-dimensional (2D) coordinate system and/or a three-dimensional (3D) coordinate system. In some implementations, the information tracking device 105 may provide the viewpoint region at the position within the display area of the GUI based on the coordinates associated with the GUI. In some implementations, the viewpoint region may be associated with a size, a shape, and or dimensions (e.g., as shown in FIG. 1B, the viewpoint region may have a rectangular shape based on height and width dimensions). In this way, one or more elements, associated with the content, may be positioned within the viewpoint region (e.g., shown as the "Movie Subscription" icon including the text indicating "$4.99/month," the "Get it now" button, the "Additional information" button, the "Music Subscription" icon including the text indicating "$4.99/month," the "Purchase now" button, and the "Learn more" button being positioned within the viewpoint region in FIG. 1B).

Although the information tracking device 105 is described as providing a single viewpoint region within the display area of the GUI, the information tracking device 105 may provide any suitable number of viewpoint regions having any suitable size, shape, and/or dimensions and/or that are positioned at any suitable positions within the display area of the GUI. In this way, the information tracking device 105 may more granularly track regions of the GUI (e.g., by tracking the viewpoint regions provided within the display areas of the GUI). Furthermore, although the viewpoint region is described as having a rectangular shape in connection with FIG. 1B and reference number 120, the viewpoint region may be any suitable shape having any suitable size and/or dimensions.

Additionally, although the viewpoint region is shown in FIG. 1B as being provided within a 2D interface, in some other implementation, the information tracking device 105 may provide the viewpoint region within a 3D interface. For example, the viewpoint region may be provided as a 3D cuboid (e.g., that is define by height, width, and depth coordinates). Furthermore, although the viewpoint region is described as having a rectangular shape (e.g., associated with a 2D interface) and/or a cuboid shape (e.g., associated with a 3D face), the viewpoint region may be any suitable shape having any size and/or suitable dimensions.

In some implementations, the viewpoint region may include a border (e.g., an opaque, a translucent, or a semi-transparent border, among other examples) that is visible to the user and an interior (e.g., a transparent or an empty interior, among other examples) that is not visible to the user. In this way, if the user views the viewpoint region, then the viewpoint region may focus their attention to the interior of the viewpoint region (e.g., where content is visible). Although the border of the viewpoint region is described as being visible to the user and the interior of the viewpoint region is described as being not visible to the user, the border of the viewpoint region and/or the interior of the viewpoint region may be displayed, via the GUI, via any suitable visibility. As an example, if the information tracking device is obtaining and/or analyzing information, but is not providing the user with contextual assistance, then the border of the viewpoint region and the interior of the viewpoint region may both be transparent (e.g., not visible to the user).

In some implementations, the viewpoint region may be provided at a fixed position relative to positions included in the display area of the GUI (e.g., based on coordinates associated with the GUI). In some implementations, the position of the viewpoint region may be associated with a region of the GUI that is associated with a viewpoint of the user that utilizes the user device 110 to display the GUI (e.g., during the user session). For example, the information tracking device 105 may provide the viewpoint region at a position that is associated with a center-top region of the display area of the GUI (e.g., because the user is likely to initially view the center-top region of the display area of the GUI, and/or because the content and/or the one or more elements are positioned in the center-top region of the display area of the GUI).

Although the position of the viewpoint region is described as being a fixed position, relative to positions included in the display area of the GUI, in connection with FIG. 1B and reference number 120, in some implementations, the position of the viewpoint region may be a variable position (e.g., the position of the viewpoint region may change as a function of time or other parameters relative to positions included in the display area). Additionally, although the position of the viewpoint region is described as being associated with a region of the GUI where the user is likely to view the display area of the GUI, the position of the viewpoint region may be any suitable position (e.g., within the display area of the GUI).

For example, the information tracking device 105 may determine a focus point of the user during the user session. In some implementations, the information tracking device 105 may determine the focus point of the user based on determining a position and/or a location of a user input (e.g., provided via the user utilizing the user device 110). For example, the information tracking device 105 may determine the focus point of the user based on a position and/or a location associated with a cursor that may be moved across the display area of the GUI (e.g., via the user moving a mouse that causes the cursor to move, via the user using spinning a mouse wheel that causes the cursor to move, via the user touching a trackpad that causes the cursor to move, via the user using touch gestures that cause the cursor to move, and/or via the user device 110 capturing a user input that causes the cursor to move, among other examples).

In some implementations, the information tracking device 105 may determine the focus point by tracking a user input (e.g., provided by the user via the GUI). As an example, the information tracking device 105 and/or another device may track (e.g., using one or more gaze tracking techniques) a gaze of the user associated with the user session. The information tracking device 105 may determine a position of the gaze of the user. The information tracking device 105 may provide the viewpoint region at a position that corresponds to the position of the gaze of the user (e.g., relative to the display area of the GUI). In some implementations, one or more elements, associated with the content, may be positioned within the viewpoint region (e.g., shown as the "Movie Subscription" icon including the text indicating "$4.99/month," the "Get it now" button, the "Additional information" button, the "Music Subscription" icon including the text indicating "$4.99/month," the "Purchase now" button, and the "Learn more" button being positioned within the viewpoint region in FIG. 1B).

Figure 1C:
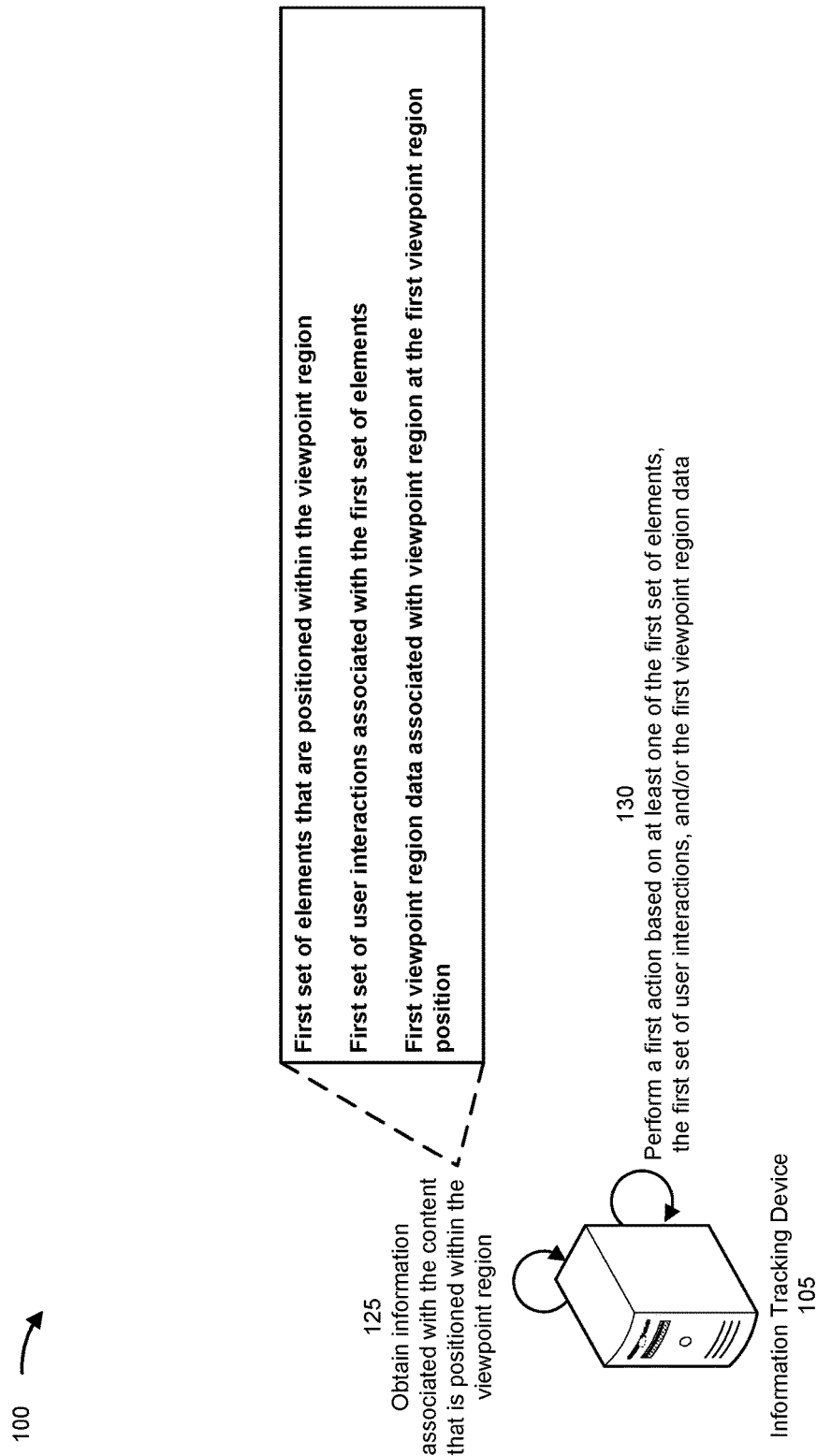

As shown in FIG. 1C, and by reference number 125, the information tracking device 105 may obtain information associated with the content that is positioned within the viewpoint region. In some implementations, the information tracking device 105 may track a content position that is associated with a position of content positioned within the viewpoint region. The information tracking device 105 may identify a first set of elements (e.g., associated with the content that is positioned within the viewpoint region), that is positioned within the viewpoint region. In some implementations, to identify the first set of elements, the information tracking device 105 may scan (e.g., traverse) a document object model (DOM) hierarchy associated with the GUI. As an example, the information tracking device 105 may traverse the DOM to identify elements that are positioned within the viewpoint region (e.g., the coordinates of the elements correspond to positions within the coordinates associated with the viewpoint region). Although the information tracking device 105 is described as identifying the first set of elements that are positioned within the viewpoint region by traversing the DOM, the information tracking device 105 may use any suitable technique(s) to identify elements that are positioned within the viewpoint region.

In some implementations, the information tracking device 105 may track and/or monitor user interactions associated with the GUI. For example, the information tracking device 105 may track and/or monitor user interactions associated with the viewpoint region (e.g., that occur within the viewpoint region) and/or user interactions, such as scroll events or other navigation interactions, that cause the content that is displayed within the display area of the GUI to change.

In some implementations, the information tracking device 105 may detect a first set of user interactions associated with the first set of elements that are positioned within the viewpoint region. As an example, the first set of user interactions may include one or more click events (e.g., associated with the user utilizing the user device 110 to click one or more elements included in the first set of elements), one or more hover events (e.g., associated with the user causing, via the user device 110, a cursor to hover over one or more elements included in the first set of elements), and/or one or more element visit events (e.g., associated with the user utilizing the user device 110 to click and/or hover over one or more elements included in the first set of elements), among other examples. In some implementations, the information tracking device 105 may track a time and/or a date associated with the user interactions. For example, the information tracking device 105 may determine a time and/or a date that the elements, included in the first set of elements, are clicked on, hovered over, and/or otherwise visited, among other examples.

Additionally, or alternatively, the information tracking device 105 may obtain first viewpoint region data (e.g., associated with the first set of elements, the first set of user interactions, and/or the viewpoint region). For example, the information tracking device 105 may determine a first time period that the first set of elements are positioned within the viewpoint region.

As another example, the information tracking device 105 may determine which elements, included in the first set of elements, are not associated with the first set of user interactions (e.g., elements that have not been clicked on and/or elements that have not been hovered over, among other examples). As another example, the information tracking device 105 may determine a last viewed element (e.g., an element that is last clicked on and/or last hovered over), a distance between the last viewed element and an element that the user did not interact with (e.g., an element that is not clicked on and/or hovered over), a type of device that the user utilizes to interact with the viewpoint region, and/or whether an automated support agent (e.g., a chatbot) provided assistance to the user when the user is interacting with the GUI in the viewpoint region, among other examples.

As further shown in FIG. 1C, and by reference number 130, the information tracking device 105 may perform a first action (e.g., related to providing contextual assistance to the user) based on at least one of the first set of elements, the first set of user interactions, and/or the first viewpoint region data. In some implementations, to perform the first action, the information tracking device 105 may determine a status associated with the user, such as an interested status, an uninterested status, or a confused status. For example, the information tracking device 105 may analyze (e.g., using one or more machine learning techniques) information associated with the first set of elements, the first set of interactions, and/or the first viewpoint region data, as described in more detail elsewhere herein.

In some implementations, to determine the status associated with the user, the information tracking device 105 may compare a number of visited elements associated with the viewpoint region and a threshold number of visited elements. For example, the information tracking device 105 may determine that the user is associated with an interested status based on determining that a number of visited elements satisfies the threshold number of visited elements. As another example, the information tracking device 105 may determine that the user is associated with an uninterested status based on determining that the number of visited elements does not satisfy the threshold number of visited elements.

In some implementations, to determine the status associated with the user, the information tracking device 105 may compare a time metric associated with viewing one or more elements (e.g., an average time that the user takes to view one or more elements that are positioned within the viewpoint region) and a time threshold. As an example, the information tracking device 105 may determine that the user is associated with an interested status based on determining that the time metric associated with viewing the one or more elements satisfies the time threshold. As another example, the information tracking device 105 may determine that the user is associated with an uninterested status based on determining that the time associated with viewing the one or more elements does not satisfy the time threshold.

In some implementations, to determine the status associated with the user, the information tracking device 105 may determine that the user clicked on and/or hovered over one or more elements included in the first set of elements that are positioned within the viewpoint region. For example, the information tracking device 105 may determine that the user is interested in the one or more elements included in the first set of elements (e.g., because the user clicked on and/or hovered the one or more elements included in the first set of elements).

In some implementations, the information tracking device 105 may determine that the user is associated with a confused status. For example, the information tracking device 105 may determine that the user is associated with a confused status based on determining that a number of visited elements have been hovered over but not clicked on by the user (e.g., by the user utilizing the user device 110) satisfies a threshold. Additionally, or alternatively, the information tracking device 105 may determine that the user is associated with the confused status based on determining that the time metric associated with viewing the one or more elements satisfies the time threshold, but the user has not clicked on a threshold number of the one or more elements.

In this way, the information tracking device 105 may dynamically and/or proactively provide contextual assistance to the user (e.g., during the user session). For example, by determining that the user is associated with an interested status, an uninterested status, or a confused status, the information tracking device 105 may provide assistance to the user (e.g., during the user session) based on the status of the user. In some implementations, the information tracking device 105 may configure a chatbot (e.g., an auto-triggered contextual chatbot) to automatically provide, via the GUI, contextual assistance to the user.

For example, if the information tracking device 105 determines that the user is associated with an interested status (e.g., associated with the viewpoint region), then the chatbot may be triggered (e.g., based on receiving, from the information tracking device 105, an indication that the user is associated with the interested status) to automatically provide information that is similar to information associated with the one or more elements that are positioned within the viewpoint region. Because the user is interested in the one or more elements that are positioned within the viewpoint region, the user is likely to be interested in the information that is similar to the information associated with the one or more elements that are positioned within the viewpoint region.

As an example, if the information tracking device 105 determines that the user is associated with an uninterested status (e.g., associated with the viewpoint region), then the chatbot may be triggered (e.g., based on receiving, from the information tracking device 105, an indication that the user is associated with the uninterested status) to automatically provide information that is dissimilar to information associated with the one or more elements that are positioned within the viewpoint region. Because the user is not interested in the one or more elements that are positioned within the viewpoint region, the user may desire to see information that is dissimilar to the information associated with the one or more elements that are positioned within the viewpoint region.

As another example, if the information tracking device 105 determines that the user is associated with a confused status (e.g., associated with the viewpoint region), then the chatbot may be triggered (e.g., based on receiving, from the information tracking device 105, an indication that the user is associated with the confused status) to automatically provide information requesting that the user confirms whether the user is interested in the one or more elements that are positioned within the viewpoint region or not interested in the one or more elements that are positioned within the viewpoint region.

Although the first action (e.g., performed by the information tracking device 105) is described as determining the status associated with the user in connection with FIG. 1C and reference number 130, the information tracking device 105 may perform other actions, as described in more detail elsewhere herein, and/or any other suitable action(s). Furthermore, although the chatbot is described as automatically providing information based on receiving an indication from the information tracking device 105 indicating the status associated with the user, the chatbot may automatically provide any suitable information based on any suitable trigger associated with indicating the status associated with the user.

In some implementations, to perform the first action, the information tracking device 105 may provide, via the GUI, information associated with at least one of the first set of elements, the first set of user interactions, and/or the first viewpoint region position data (e.g., the time period that the viewpoint region is at the first viewpoint region position). In some implementations, to perform the first action, the information tracking device 105 may perform one or more operations associated with at least one of the viewpoint region and/or the first set of elements, as described in more detail elsewhere herein. In some implementations, the information tracking device 105 may determine an intent associated with the user session. For example, the information tracking device 105 may determine that the intent associated with the user session is a purchase-based intent (e.g., related to the user desiring to make a purchase during the user session) based on determining that the user is associated with an interested status. As another example, the information tracking device 105 may determine that the intent associated with the user session is an inquiry-based intent (e.g., related to the user desiring to receive information associated with a product and/or a service during the user session) based on determining that the user is associated with a confused status. Although the information tracking device 105 has been described as determining the intent associated with the user session based on determining that the user is associated with an interested status and a confused status, the information tracking device 105 may determine the intent associated with the user session in any suitable manner based on any suitable information. The information tracking device 105 may provide, via the GUI, an intent indication based on the intent.

Figure 1D:
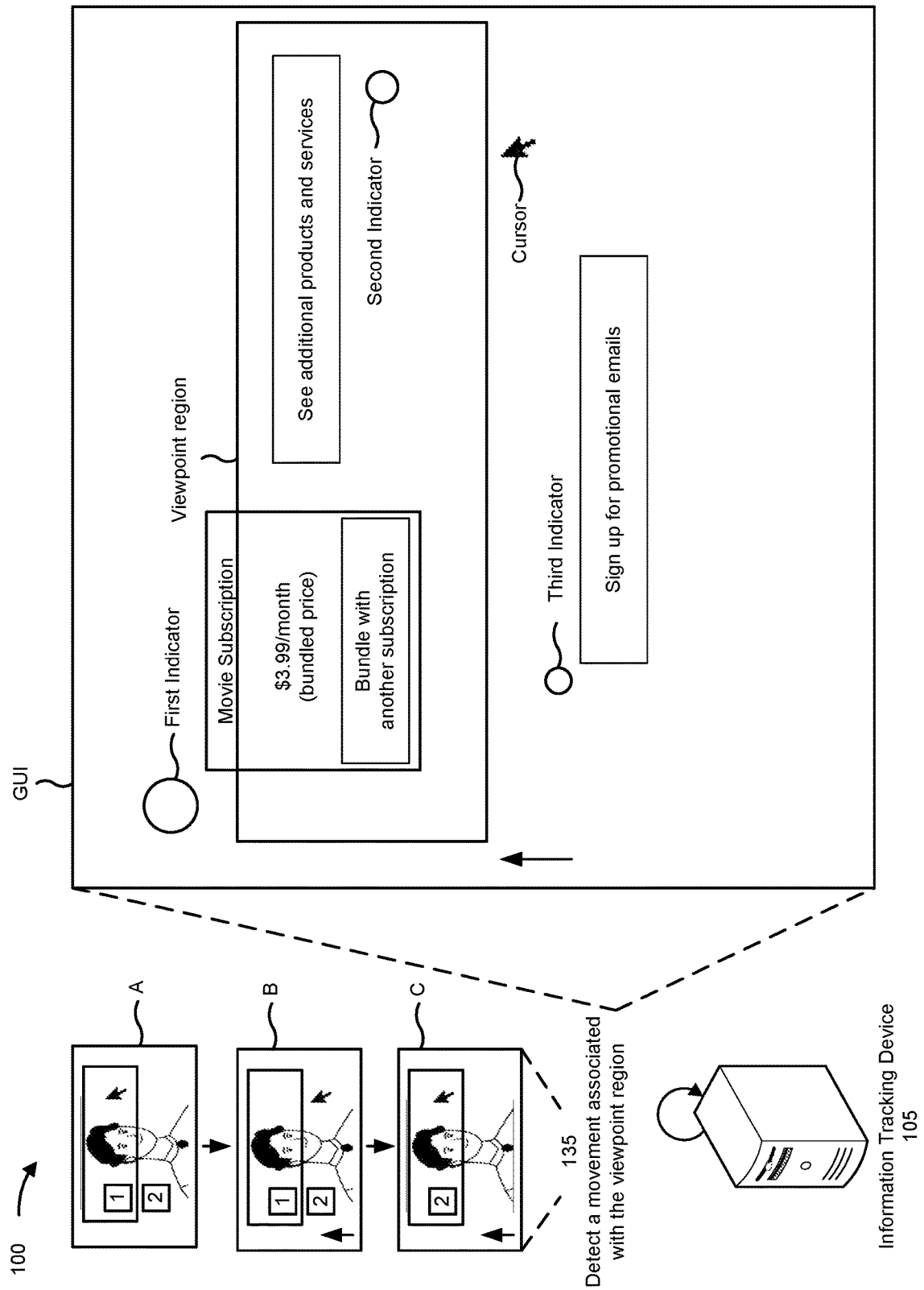

As shown in FIG. 1D, and by reference number 135, the information tracking device 105 may detect a movement event associated with the viewpoint region. In some implementations, the movement event may be associated with one or more scrolling operations, as described in more detail elsewhere herein. For example, the one or more scrolling operations may be associated with one or more user inputs that cause the content displayed in the GUI to scroll. As an example, the one or more user inputs may be associated with the user clicking and dragging a scrollbar, using a scroll wheel on a mouse, using touch gestures (e.g., swiping and/or pinching, among other examples), and/or pressing keyboard shortcuts (e.g., arrow keys, a page up key, and/or a page down key), among other examples.

In some implementations, the one or more user inputs that cause the content displayed in the GUI to scroll may be associated with a gaze of the user. For example, the information tracking device 105 may obtain and/or process image data associated with the gaze of the user. As an example, the information tracking device 105 may cause the user device 110 to obtain the image data associated with the gaze of the user. The user device 110 may provide, and the information tracking device 105 may receive, the image data associated with the gaze of the user. The information tracking device 105 may use one or more computer vision techniques to detect and/or track a focus point of the gaze of the user. The information tracking device 105 may determine a direction and/or an orientation of the focus point of the gaze of the user (e.g., in real-time).

The information tracking device 105 may map the direction and/or orientation of the focus point of the gaze of the user onto the display area of the GUI (e.g., based on the coordinate system associated with the GUI). In other words, for example, the information tracking device 105 may determine a reference point associated with the focus point of the gaze of the user that corresponds to a position within the display area of the GUI (e.g., based on the coordinate system associated with the GUI). In this way, the information tracking device 105 may determine that the user is likely focused on content that is at a position within the display area of the GUI that corresponds to the position of the reference point. In some implementations, the focus point of the gaze of the user may be used to control and/or move a cursor associated with the display area of the GUI, as described in more detail elsewhere herein.

Although the information tracking device 105 is described as performing operations associated with causing image data associated with the gaze of the user to be obtained and/or associated with processing the image data associated with the gaze of the user, in some other implementations, another device and/or other devices may use one or more techniques (e.g., one or more computer vision techniques) to obtain data associated with the user (e.g., data associated with the eyes of the user) and/or to process the data associated with the user (e.g., the data associated with the eyes of the user). As an example, an eye tracking device (e.g., that is separate from the information tracking device 105) may use electrooculography techniques (e.g., which are associated with measuring electrical signals generated by eye movements of the user) and/or infrared techniques (e.g., which are associated with using infrared light to detect reflections from corneas and/or pupils of the eyes of the user), among other examples, to obtain the data associated with focus point of the gaze of the user and/or to process the data associated with the focus point of the gaze of the user.

As another example, a server device may receive, and the information tracking device 105 and/or another device may provide, the data associated with the focus point of the gaze of the user. The server device may process the data associated with the focus point of the gaze of the user. The server device may map the focus point of the gaze of the user onto the display area of the GUI (e.g., in real-time).

In some implementations, the information tracking device 105 may automatically scroll the content associated with the GUI. For example, the information tracking device 105 may detect and/or track a position of a cursor (e.g., that is displayed within the display area of the GUI) relative to the viewpoint region. In some implementations, the information tracking device 105 may automatically scroll the content based on the position of the cursor being at a position that is not within the viewpoint region (e.g., the information tracking device 105 does not automatically scroll the content based on the position of the cursor being at a position that is within the viewpoint region).

In some implementations, the information tracking device 105 may detect and/or track the position of the cursor relative to the viewpoint region based on the one or more user inputs associated with the scrolling operations. For example, the information tracking device 105 may enable the focus point of the user to control and/or move the cursor within the display area of the GUI. As shown in box "A" of FIG. 1D, which includes box "1" at a position within the viewpoint region and box "2" at a position that is not within the viewpoint region, the focus point of the user is at a position relative to the display area of the GUI that corresponds to the position of the cursor being at a position that is within the viewpoint region. Because the position of the cursor is at the position that is within the viewpoint region, the information tracking device 105 does not automatically scroll the content.

As shown in box "B" of FIG. 1D, which includes box "1" at a position within the viewpoint region and box "2" at a position that is not within the viewpoint region, the focus point of the user is at a position relative to the display area of the GUI that corresponds to the position of the cursor being at a position that is not within the viewpoint region (e.g., the position of the cursor is at a position that is below the viewpoint region). Because the position of the cursor is at the position that is not within the viewpoint region, the information tracking device 105 automatically scrolls the content in one or more directions that cause the position of the cursor to be within the viewpoint region, as described in more detail elsewhere herein.

For example, as shown in box "C" of FIG. 1D, which includes box "2" at a position within the viewpoint region, the focus point of the user is at a position relative to the display area of the GUI that corresponds to the position of the cursor being at a position that is within the viewpoint region (e.g., based on the information tracking device 105 automatically scrolling the content in a direction toward the cursor based on the position of the cursor until the position of the cursor is within the viewpoint region). Although the information tracking device 105 is described as detecting and/or tracking the position of the cursor relative to the viewpoint region based on the focus point of the gaze of the user, the information tracking device 105 may detect and/or track the position of the cursor relative to the viewpoint region based on any suitable user input (e.g., any of the user inputs described in further detail elsewhere herein). Thus, in some implementations, the movement event may result in a change to the content that is displayed within the display area of the GUI, as described in more detail elsewhere herein.

In some implementations, the information tracking device 105 may determine an activity level associated with the first set of elements based on the first set of user interactions and/or based on the first viewpoint region position data. For example, the activity level associated with the first set of elements may be related to an amount of time that the cursor spends at positions associated with position of the first set of elements relative to the display area. As an example, the activity level may be associated with an amount of time that the cursor spends hovered over the first set of elements. As another example, the activity level may be associated with a number of visits and/or a number of revisits to elements included in the first set of elements (e.g., based on a number of clicks, performed by the user, associated with the elements included in the first set of elements).

In some implementations, the information tracking device 105 may provide a data visualization based on the activity level (e.g., that includes one or more indicators). For example, the data visualization may include a first indicator (e.g., shown as "First Indicator" in FIG. 1D), a second indicator (e.g., shown as "Second Indicator" in FIG. 1D), and/or a third indicator (e.g., shown as "Third Indicator" in FIG. 1D). In some implementations, a size of the first indicator, the second indicator, and the third indicator may be based on a magnitude of the activity level. For example, if the first indicator (e.g., "First Indicator" shown in FIG. 1D) is associated with a first amount of time, if the second indicator (e.g., "Second Indicator" shown in FIG. 1D) is associated with a second amount of time that is less than the first amount of time, and if the third indicator (e.g., "Third Indicator" shown in FIG. 1D) is associated with a third amount of time that is less than the second amount of time, then the first indicator may have a size that is larger than the second indicator and the second indicator may have a size that is larger than the third indicator. In this way, the data visualization may be associated with indicating how a user spends time browsing the content within the display area. The information tracking device 105 may provide the data visualization to another device, such as a server device.

Furthermore, although the information tracking device 105 is described as determining an activity level associated with the first set of elements based on the first set of user interactions and/or based on the first viewpoint region position data, the information tracking device 105 may determine an activity level associated with multiple elements and/or multiple viewpoint regions provided within the display area. As an example, the information tracking device 105 may provide a data visualization based on the activity level associated with the multiple elements and/or the multiple viewpoint region (e.g., the information tracking device 105 may aggregate data associated with the activity level related to the multiple elements and/or the multiple viewpoint regions to be included in the data visualization of the activity level).

Figure 1E:
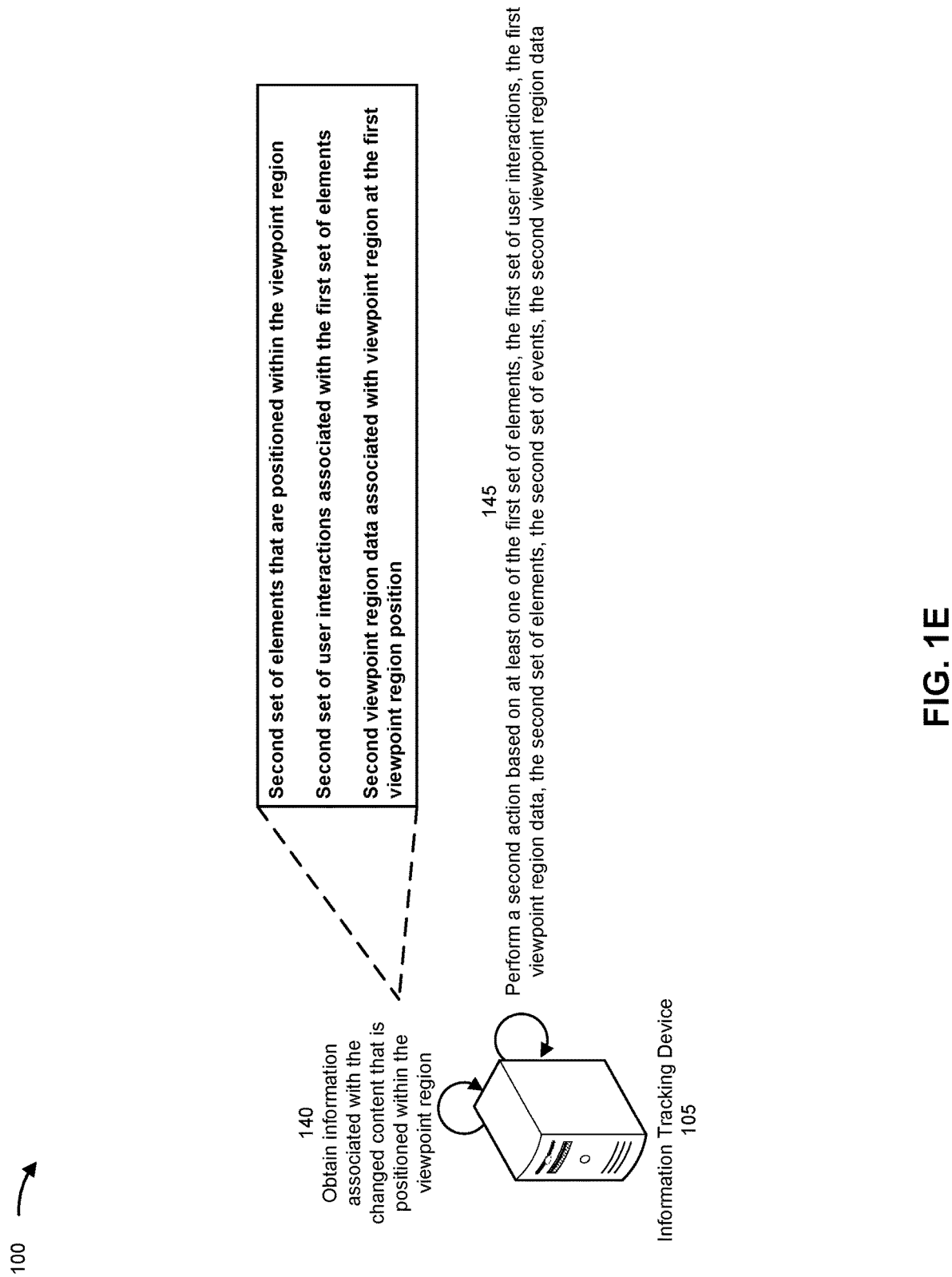

As shown in FIG. 1E, and by reference number 140, the information tracking device 105 may obtain information associated with the changed content that is positioned within the viewpoint region. In some implementations, the information tracking device 105 may track a second content position that is associated with a position of content within the viewpoint region. The information tracking device 105 may identify a second set of elements (e.g., associated with the changed content that is positioned within the viewpoint region), that is positioned within the viewpoint region (e.g., in a same or similar manner that the information tracking device 105 identifies the first set of elements, as described in connection with FIG. 1C and reference number 125). As an example, the information tracking device 105 may detect a second set of user interactions associated with the second set of elements that are positioned within the viewpoint region (e.g., in a same or similar manner that the information tracking device 105 detects the first set of user interactions, as described in connection with FIG. 1C and reference number 125).

As another example, the information tracking device 105 may obtain second viewpoint region data associated with the second set of elements, the second set of user interactions, and/or the viewpoint region (e.g., in a same or similar manner that the information tracking device 105 obtains the first viewpoint region data associated with the first set of elements, the first set of user interactions, and the viewpoint region, as described in connection with FIG. 1C and reference number 125). Additionally, or alternatively, the information tracking device 105 may determine a duration associated with the movement event. For example, the duration may indicate a time taken for the content that is positioned within the viewpoint region to change to the changed content that is positioned within the viewpoint region (e.g., based on content being scrolled, automatically or otherwise, as described in more detail elsewhere herein).

As further shown in FIG. 1E, and by reference number 145, the information tracking device 105 may perform a second action based on at least one of the first set of elements, the first set of user interactions, the first viewpoint region data, the second set of elements, the second set of user interactions, and/or the second viewpoint region data. For example, the information tracking device 105 may perform the second action in a same or similar manner that the information tracking device 105 performs the first action, as described in connection with FIG. 1C and reference number 130 and/or as described in more detail elsewhere herein).

In some implementations, the first action and/or the second action performed by the information tracking device 105 may be to provide, to the user, a contextual gliding window. For example, to provide the contextual gliding window, the information tracking device 105 may highlight elements that are positioned within the viewpoint region and/or enable the user to select a highlighted element via a user input (e.g., provided by the user and/or captured by the information tracking device 105). In some implementations, the first action and/or the second action performed by the information tracking device 105 may be to provide, to the user, a contextual animation. For example, to provide the contextual animation, the information tracking device 105 may provide animations associated with the elements that are positioned within the viewpoint region.

In some implementations, the first action and/or the second action performed by the information tracking device 105 may be to provide a contextual in-page view associated with the viewpoint region and/or the elements that are positioned within the viewpoint region. For example, to provide the in-page view associated with the viewpoint region and/or the elements that are positioned within the viewpoint region, the information tracking device 105 may provide, within the GUI, a window that includes information associated with the viewpoint region and/or the elements that are positioned within then viewpoint region.

Furthermore, in some implementations, the first action and/or the second action information performed by the tracking device 105 may be to provide a contextual blur and read aloud operation (e.g., which is associated with blurring portions of the GUI that are positioned outside of the viewpoint region and providing an audio indication associated with the viewpoint region for output via a speaker component of the user device 110). Additionally, or alternatively, the first action and/or the second action performed by the information tracking device 105 may be to automatically focus information included within the viewpoint region. As another example, the first action and/or the second action performed by the information tracking device 105 may be to automatically translate information that is provided within the viewpoint region, among other examples.

Although the information tracking device 105 is described as performing the first action and/or the second action based on at least one of the first set of elements, the first set of user interactions, the first viewpoint region data, the second set of elements, the second set of user interactions, and/or the second viewpoint region data, the information tracking device 105 may perform the first action and/or the second action based on any suitable information. Furthermore, although the information tracking device 105 is described as performing the first action (e.g., in connection with FIG. 1C and reference number 130) and the second action (e.g., in connection with FIG. 1E and reference number 145), the information tracking device 105 may perform any suitable action or number of actions, as described in more detail elsewhere herein.

Figure 1F:
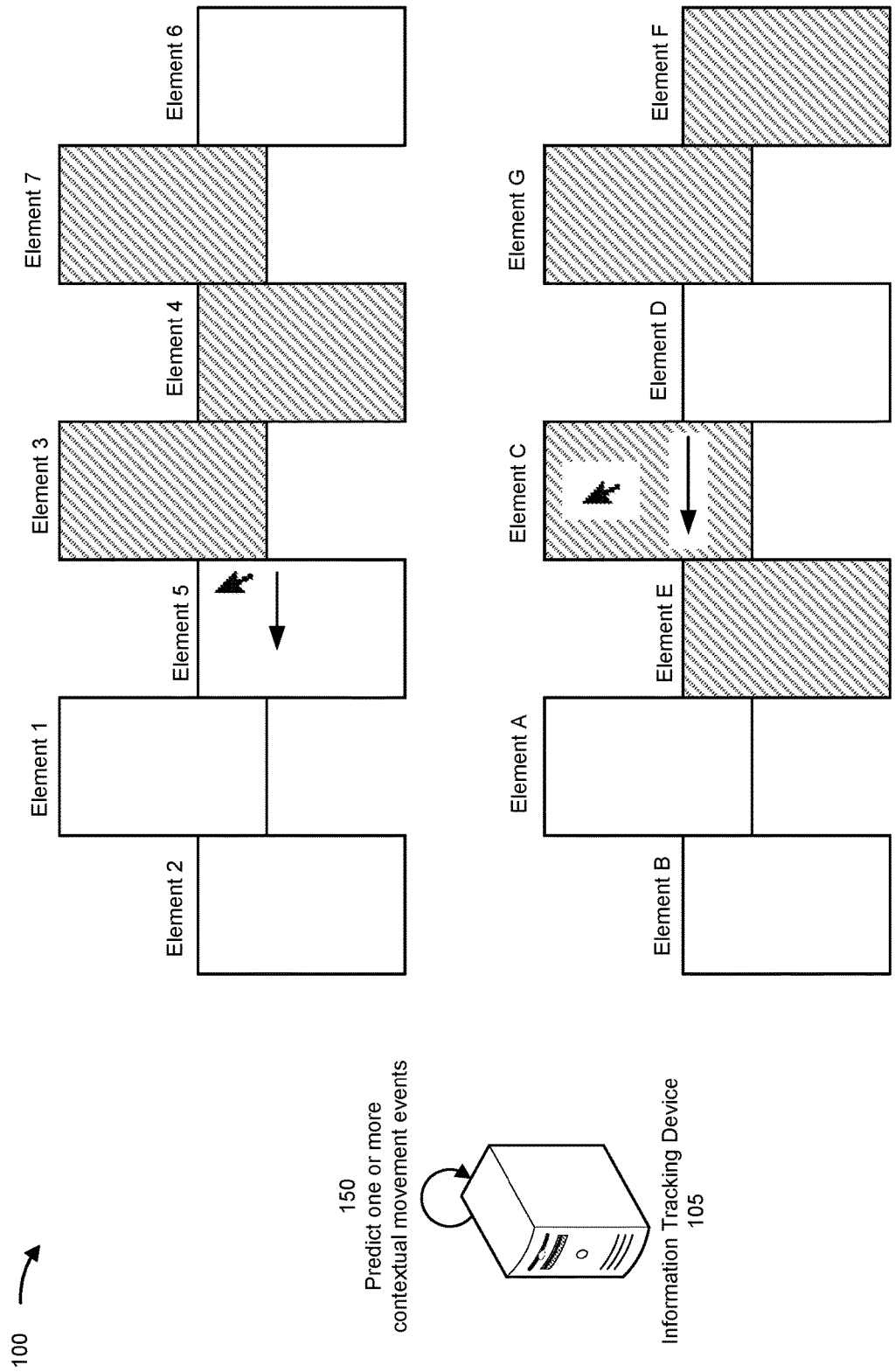

As shown in FIG. 1F, and by reference number 150, the information tracking device 105 may predict one or more contextual element selections. As an example, the information tracking device 105 may predict, based on a first set of viewed elements and/or other information), a second set of viewed elements. For example, the first set of viewed elements may be associated with a last set of viewed elements (e.g., a set of elements, positioned within the viewpoint region, that the user last clicks on and/or hovers over) and the predicted second set of viewed elements may be associated with a predicted set of next viewed elements (e.g., elements, positioned within the viewpoint region, that the information tracking device 105 predicts the user will click on and/or hover over after viewing the first set of elements).

In some implementations, the information tracking device may track and/or detect positions, speeds, and/or directions associated with movements of a cursor (e.g., that is controlled by the user at a position within the viewpoint region) and/or relative positions of elements that are positioned within the viewpoint region. The information tracking device 105 may predict the second set of viewed elements based on the positions, speeds and/or directions associated with the movements of the cursor and/or based on the relative positions of the elements that are positioned within the viewpoint region.

For example, as shown in FIG. 1F, the first set of viewed elements includes "Element 3," "Element 4," and Element "7" (e.g., out of a set of seven elements), and the predicted second set of viewed elements includes "Element 1," "Element 2," "Element 5", and "Element 6." As further shown in FIG. 1F, based on the cursor hovering over "Element 5" and moving in a direction toward "Element 1" and "Element 2," the information tracking device 105 predicts that the cursor (e.g., that is controlled by the user) will move from "Element 5" to "Element 1," "Element 2," or "Element 6" (e.g., based on "Element 3," "Element 4", and "Element 7" being last viewed, based on "Element 1," "Element 2," and "Element 5" being not yet viewed and/or based on the position, speed and/or direction associated with movements of the cursor, and based on "Element 6" being not yet viewed and/or being a next numbered element relative to "Element 5").

As another example, as shown in FIG. 1F, the first set of viewed elements includes "Element C," "Element E," Element "F," and "Element G," and the predicted second set of viewed elements includes "Element A," "Element B," and "Element D". As further shown in FIG. 1F, the cursor hovers over "Element C" and moves in a direction toward "Element E," "Element A," and "Element B. Thus, the information tracking device 105 predicts that the cursor (e.g., that is controlled by the user) will move from "Element C" to "Element A," "Element B," or "Element D" (e.g., based on "Element C," "Element E", "Element F, and "Element G" being last viewed, based on "Element A," "Element B" being not yet viewed and/or based on the position, speed and/or direction associated with movements of the cursor, and based on "Element D" being not yet viewed and/or being a next lettered element relative to "Element C").

In some implementations, the information tracking device 105 may determine one or more time periods associated with the first set of viewed elements and/or the second set of viewed elements. For example, the information tracking device 105 may determine a time period associated with the cursor moving from the last viewed element to the predicted next viewed element. As another example, the information tracking device 105 may determine a time period associated with the cursor moving from the first set of viewed elements, but not moving to the predicted set of next viewed elements (e.g., because the cursor remains in a position associated with the first set of elements and/or moves to a position that is not predicted by the information tracking device 105).

In this way, the information tracking device 105 may dynamically and/or proactively provide contextual assistance to the user (e.g., during the user session). As an example, the information tracking device 105 may determine that the user is interested in one or more elements (e.g., based on determining that the time period associated with the cursor moving from the last viewed element to the predicted next element satisfies a time threshold). As another example, the information tracking device 105 may determine that the user is not interested in one or more elements (e.g., based on determining that the time period associated with the cursor moving from the first set of viewed elements, but not moving to the predicted set of next viewed elements, satisfies a times threshold). As still another example, the information tracking device 105 may determine that the user is confused about one or more elements (e.g., based on the cursor remaining in a position near one or more elements, but not hovering over the one or more elements). As an example, the information tracking device 105 may automatically provide (e.g., the chatbot may be triggered based on receiving, from the information tracking device 105, an indication that the user is interested in one or more elements, not interested in one or more elements, or confused about one or more elements) information in a same or similar manner that the chatbot automatically provides information to the user, as described in connection with FIG. 1C and reference number 125, and/or as described in more detail elsewhere herein.

In this way, some implementations described herein enable enhanced GUI information tracking and user assistance based on the enhanced GUI information tracking. For example, the information tracking system may use the information tracking device to dynamically and/or proactively provide contextual assistance (e.g., based on tracking the viewpoint region) to the user (e.g., during the user session). For example, the information tracking device can determine a region of the web page where the user performs the user interactions, can determine which elements that the user traverses as the user is browsing the web page, can determine which elements that the user does not traverse as the user is browsing, and can determine how the user navigates through the web page (e.g., because the information tracking device tracks and/or monitors user interactions that are performed within the viewpoint region).

For example, because the information tracking device is able to evaluate how the user navigates, browses, or otherwise interacts with the web page, the information tracking device has the ability to provide contextual assistance to a user (e.g., during a user session). As an example, the information tracking device may provide a contextual gliding window (e.g., to highlight elements that are positioned within the viewpoint region and enable the user to select a highlighted element via a user input). In other examples, the information tracking device may use the tracked interaction information to provide contextual animation (e.g., which is associated with providing animations associated with the viewpoint region), a contextual in-page view (e.g., which is associated with providing an in-page view associated with the viewpoint region), and/or a contextual automatically-triggered chatbot (e.g., which is associated with providing automated support, associated with the viewpoint region, to the user). Furthermore, in still other examples, the information tracking device described herein may use the tracked interaction information to enable contextual scrolling (e.g., which is associated with automatically scrolling to relevant information associated with the viewpoint region) and/or a contextual blur and read aloud operation (e.g., which is associated with blurring portions of the GUI that are positioned outside of the viewpoint region and provide an audio indication associated with the viewpoint region for output via a speaker component of the user device), among other examples, as described in more detail elsewhere herein.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
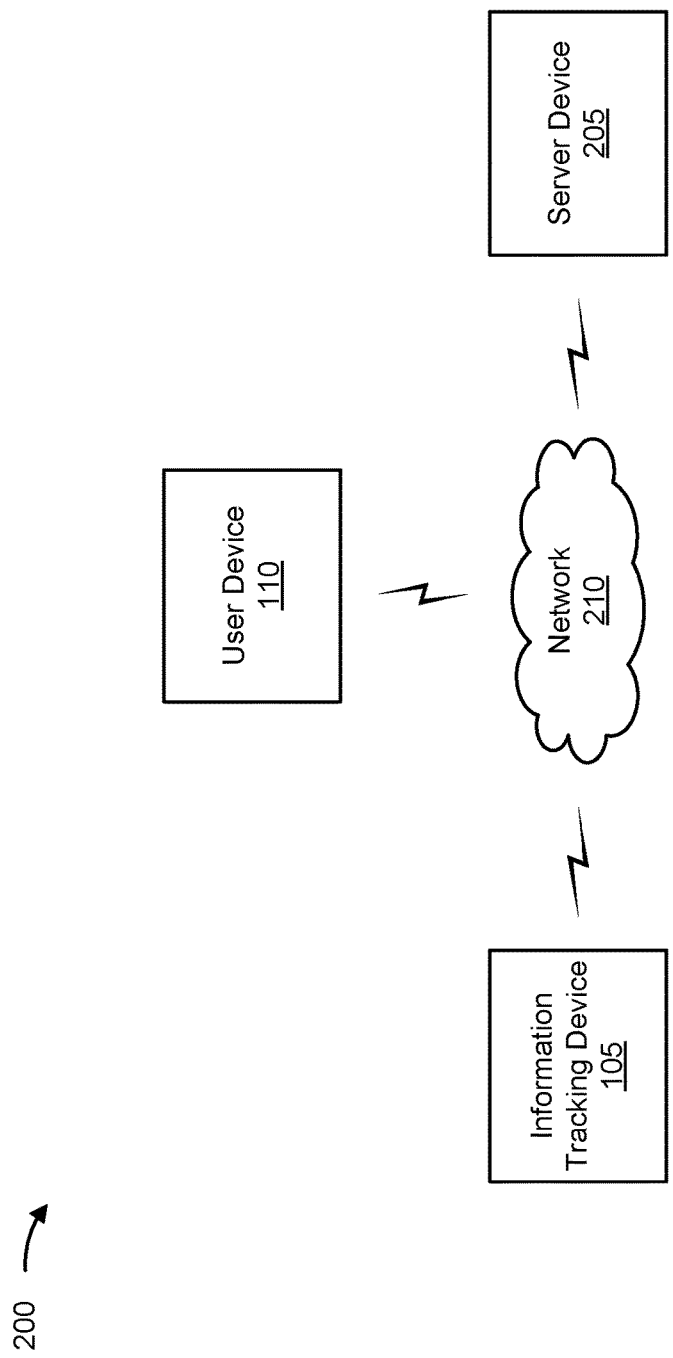
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an information tracking device 105, a user device 110, a server device 205, and a network 210. Devices of environment 200 may interconnect via wired connections, wireless connections, or a combination of wired and wireless connections.

The information tracking device 105 may include one or more devices capable of receiving, generating, storing, processing, providing, and/or routing information associated with enhanced GUI information tracking and user assistance based on the enhanced GUI information tracking, as described elsewhere herein. The information tracking device 105 may include a communication device and/or a computing device. For example, the information tracking device 105 may include a server, such as an application server, a client server, a web server, a database server, a host server, a proxy server, a virtual server (e.g., executing on computing hardware), or a server in a cloud computing system. In some implementations, the information tracking device 105 may include computing hardware used in a cloud computing environment.

The user device 110 may include one or more devices capable of receiving, generating, storing, processing, and/or providing information associated with enhanced GUI information tracking and user assistance based on the enhanced GUI information tracking, as described elsewhere herein. The user device 110 may include a communication device and/or a computing device. For example, the user device 110 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 205 may include one or more devices capable of receiving, generating, storing, processing, providing, and/or routing information associated with enhanced GUI information tracking and user assistance based on the enhanced GUI information tracking, as described elsewhere herein. The server device 205 may include a communication device and/or a computing device. For example, the server device 205 may include a server, such as an application server, a client server, a web server, a database server, a host server, a proxy server, a virtual server (e.g., executing on computing hardware), or a server in a cloud computing system. In some implementations, the server device 205 may include computing hardware used in a cloud computing environment.

The network 210 may include one or more wired and/or wireless networks. For example, the network 210 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
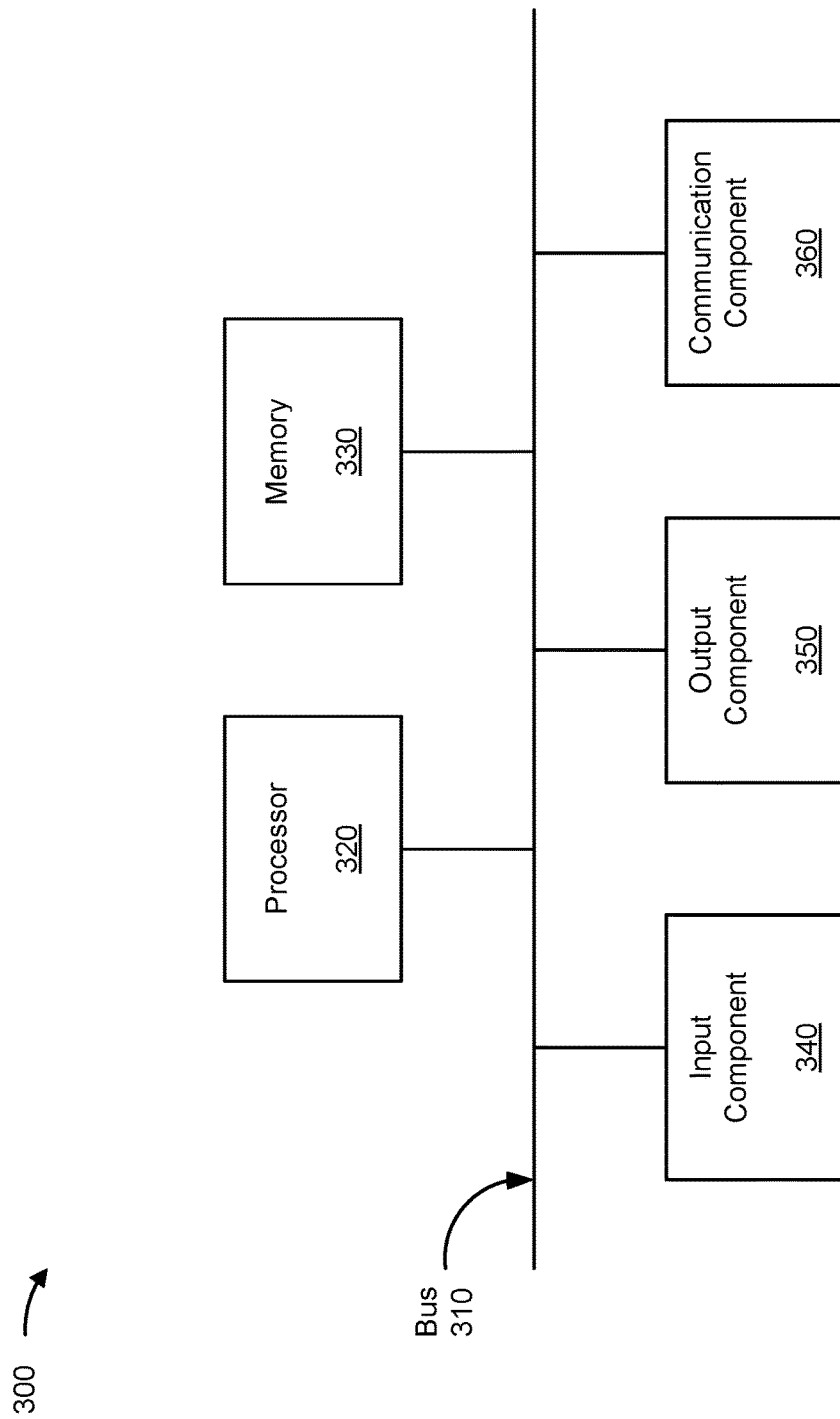
FIG. 3 is a diagram of example components of a device associated with enhanced GUI information tracking and user assistance based on the enhanced GUI information tracking.

FIG. 3 is a diagram of example components of a device 300 associated with enhanced GUI information tracking and user assistance based on the enhanced GUI information tracking. The device 300 may correspond to the information tracking device 105, the user device 110, and/or the server device 205. In some implementations, the information tracking device 105, the user device 110, and/or the server device 205 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with enhanced GUI information tracking and user assistance based on the enhanced GUI information tracking. In some implementations, one or more process blocks of FIG. 4 may be performed by an information tracking device (e.g., the information tracking device 105). In some implementations, one or more process blocks of FIG. 4 may be performed by another device or a group of devices separate from or including the information tracking device, such as a user device (e.g., the user device 110) and/or a server device (e.g., the server device 205). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include providing a GUI (block 410). For example, the information tracking device may provide, during a user session, a GUI associated with providing contextual assistance to a user associated with the user session, as described above. In some implementations, the GUI includes a viewpoint region within a display area of the GUI. In some implementations, the viewpoint region is associated with a viewpoint of the user associated with the user session.

As further shown in FIG. 4, process 400 may include tracking a content position of content (block 420). For example, the information tracking device may track a content position, as described above. In some implementations, the content position is associated with a position of content that is positioned within the viewpoint region.

As further shown in FIG. 4, process 400 may include identifying a set of elements (block 430). For example, the information tracking device may identify, based on the content position, a set of elements that is positioned within the viewpoint region, as described above. In some implementations, the set of elements is associated with the content that is positioned within the viewpoint region.

As further shown in FIG. 4, process 400 may include detecting a set of user interactions associated with the set of elements (block 440). For example, the information tracking device may detect a set of user interactions associated with the set of elements that is positioned within the viewpoint region, as described above.

As further shown in FIG. 4, process 400 may include obtaining information associated with the content that is positioned within the viewpoint (block 450). For example, the information tracking device may determine a time period that the content that is positioned within the viewpoint region remains positioned within the viewpoint region, as described above.

As further shown in FIG. 4, process 400 may include performing an action related to providing the contextual assistance (block 460). For example, the information tracking device may perform an action related to providing the contextual assistance to the user based on at least one of the set of elements, the set of user interactions, and/or the time period, as described above.

As an example, to perform the action, the information tracking device may determine a status associated with the user (e.g., an interested status, an uninterested status, or a confused status). As another example, to perform the action, the information tracking device may provide, via the GUI, information associated with at least one of the set of elements, the set of user interactions, or the time period. As another example, to perform the action, the information tracking device may perform one or more operations associated with at least one of the viewpoint region and/or the set of elements.

For example, process 400 may include determining an intent associated with the user session, and providing, via the GUI and using an automated support agent, an intent indication. As an example, process 400 may include determining an activity level associated with the set of elements based on the set of user interactions. As another example, process 400 may include providing, to a server device, a data visualization based on the activity level.

In some implementations, the content position may be a first content position, the set of elements may be a first set of elements, the set of user interactions may be a first set of user interactions, the time period may be a first time period, and the action may be a first action. Process 400 may include detecting a movement event associated with changing the content that is positioned within the viewpoint region to changed content that is positioned within the viewpoint region. Process 400 may include tracking a second content position that is associated with a position of the changed content that is positioned within the viewpoint region.

Process 400 may include identifying, based on the content position, a second set of elements that is positioned within the viewpoint region. Process 400 may include detecting a second set of user interactions associated with the second set of elements that is positioned within the viewpoint region Process 400 may include determining a second time period that the changed content that is positioned within the viewpoint region remains positioned within the viewpoint region. Process 400 may include performing a second action related to providing the contextual assistance to the user based on at least one of the first set of elements, the first set of user interactions, the first time period, the second set of elements, the second set of user interactions, or the second time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   providing, by a device and during a user session, a graphical user interface (GUI) associated with providing contextual assistance to a user associated with the user session, wherein the GUI includes a viewpoint region within a display area of the GUI, and
wherein the viewpoint region is associated with a viewpoint of the user associated with the user session; and
tracking, by the device, a content position,
wherein the content position is associated with a position of content that is positioned within the viewpoint region;
identifying, by the device and based on the content position, a set of elements that is positioned within the viewpoint region,
wherein the set of elements is associated with the content that is positioned within the viewpoint region;
detecting, by the device, a set of user interactions associated with the set of elements that is positioned within the viewpoint region;
determining, by the device, a time period that the content that is positioned within the viewpoint region remains positioned within the viewpoint region; and
performing, by the device, an action related to providing the contextual assistance to the user based on at least one of:
the set of elements,
the set of user interactions, or
the time period.

2. The method of claim 1, wherein performing the action includes:
analyzing information associated with the at least one of the set of elements, the set of user interactions, or the time period; and
determining, based on analyzing the information associated with the at least one of the set of elements, the set of user interactions, or the time period, a status associated with the user,
wherein the status is at least one of:
an interested status,
an uninterested status, or
a confused status.

3. The method of claim 1, wherein performing the action includes:
providing, via the GUI, information associated with at least one of:
the set of elements,
the set of user interactions, or
the time period.

4. The method of claim 1, further comprising:
analyzing information associated with the at least one of the set of elements, the set of user interactions, or the time period;
determining, based on analyzing the information associated with the at least one of the set of elements, the set of user interactions, or the time period, an intent associated with the user session; and
providing, via the GUI and using an automated support agent, an intent indication.

5. The method of claim 1, further comprising:
determining an activity level associated with the set of elements based on the set of user interactions; and
providing, to a server device, a data visualization based on the activity level.

6. The method of claim 1, wherein performing the action includes:
performing one or more operations associated with at least one of:
the viewpoint region, or
the set of elements.

7. The method of claim 1, wherein:
the content position is a first content position, the set of elements is a first set of elements, the set of user interactions is a first set of user interactions, the time period is a first time period, and the action is a first action, and
the method further comprises:
detecting a movement event associated with changing the content that is positioned within the viewpoint region to changed content that is positioned within the viewpoint region;
tracking a second content position,
wherein the second content position is associated with a position of the changed content that is positioned within the viewpoint region;
identifying, based on the content position, a second set of elements that is positioned within the viewpoint region;
detecting, by the device, a second set of user interactions associated with the second set of elements that is positioned within the viewpoint region;
determining, by the device, a second time period that the changed content that is positioned within the viewpoint region remains positioned within the viewpoint region; and
performing a second action related to providing the contextual assistance to the user based on at least one of:
the first set of elements,
the first set of user interactions,
the first time period,
the second set of elements,
the second set of user interactions, or
the second time period.

8. A device, comprising:
one or more processors configured to:
provide, during a user session, a graphical user interface (GUI) associated with providing contextual assistance to a user associated with the user session,
wherein the GUI includes a viewpoint region at a position within a display area of the GUI, and
wherein the viewpoint region is associated with a viewpoint of the user associated with the user session; and
track a content position,
wherein the content position is associated with a position of content that is positioned within the viewpoint region;
identify, based on the content position, a set of elements that is positioned within the viewpoint region,
wherein the set of elements is associated with the content that is positioned within the viewpoint region;
detect a set of user interactions associated with the set of elements that is positioned within the viewpoint region;
determine a time period that the content that is positioned within the viewpoint region remains positioned within the viewpoint region; and
perform an action related to providing the contextual assistance to the user based on at least one of:
the set of elements,
the set of user interactions, or
the time period.

9. The device of claim 8, wherein the one or more processors, to perform the action, are configured to:
  determine a status associated with the user,
    wherein the status is at least one of:
      an interested status,
      an uninterested status, or
      a confused status.

10. The device of claim 8, wherein the one or more processors, to perform the action, are configured to:
  provide, via the GUI, information associated with at least one of:
    the set of elements,
    the set of user interactions, or
    the time period.

11. The device of claim 8, wherein the one or more processors are further configured to:
  determine an intent associated with the user session; and
  provide, via the GUI and using an automated support agent, an intent indication.

12. The device of claim 8, wherein the one or more processors are further configured to:
  determine an activity level associated with the set of elements based on the set of user interactions; and
  provide, to a server device, a data visualization based on the activity level.

13. The device of claim 8, wherein the one or more processors, to perform the action, are configured to:
  perform one or more operations associated with at least one of:
    the viewpoint region, or
    the set of elements.

14. The device of claim 8, wherein:
  the content position is a first content position, the set of elements is a first set of elements, the set of user interactions is a first set of user interactions, the time period is a first time period, and the action is a first action, and
  wherein the one or more processors are further configured to:
    detect a movement event associated with changing the content that is positioned within the viewpoint region to changed content that is positioned within the viewpoint region;
    track a second content position,
      wherein the second content position is associated with a position of the changed content that is positioned within the viewpoint region;
    identify, based on the second content position, a second set of elements that is positioned within the viewpoint region,
      wherein the second set of elements is associated with content that is positioned within the viewpoint region;
    detect a second set of user interactions associated with the second set of elements that is positioned within the viewpoint region;
    determine a second time period that the changed content that is positioned within the viewpoint region remains positioned within the viewpoint region; and
    perform a second action related to providing the contextual assistance to the user based on at least one of:
      the first set of elements,
      the first set of user interactions,
      the first time period,
      the second set of elements,
      the second set of user interactions, or
      the second time period.

15. A non-transitory computer-readable medium storing a set of instructions, the set of instructions comprising:
  one or more instructions that, when executed by one or more processors of a device, cause the device to:
    provide, during a user session, a graphical user interface (GUI) associated with providing contextual assistance to a user associated with the user session,
      wherein the GUI includes a viewpoint region at a position within a display area of the GUI, and
      wherein the viewpoint region is associated with a viewpoint of a user associated with the user session; and
    track a content position,
      wherein the content position is associated with a position of content that is positioned within the viewpoint region;
    identify, based on the content position, a set of elements that is positioned within the viewpoint region,
      wherein the set of elements is associated with the content that is positioned within the viewpoint region;
    detect a set of user interactions associated with the set of elements that is positioned within the viewpoint region;
    determine a time period that the content that is positioned within the viewpoint region remains positioned within the viewpoint region; and
    perform an action related to providing the contextual assistance to the user based on at least one of:
      the set of elements,
      the set of user interactions, or
      the time period.

16. The non-transitory computer-readable medium of claim 15, wherein the one or more instructions, when executed by the one or more processors, further cause the device to:
  determine a status associated with the user,
    wherein the status is at least one of:
      an interested status,
      an uninterested status, or
      a confused status.

17. The non-transitory computer-readable medium of claim 15, wherein the one or more instructions, when executed by the one or more processors, further cause the device to:
  provide, via the GUI, information associated with at least one of:
    the set of elements,
    the set of user interactions, or
    the time period.

18. The non-transitory computer-readable medium of claim 15, wherein the one or more instructions, when executed by the one or more processors, further cause the device to:
  determine an intent associated with the user session; and
  provide, via the GUI and using an automated support agent, an intent indication.

19. The non-transitory computer-readable medium of claim 15, wherein the one or more instructions, when executed by the one or more processors, further cause the device to:
  perform one or more operations associated with at least one of:
    the viewpoint region, or
    the set of elements.

20. The non-transitory computer-readable medium of claim 15, wherein:
the content position is a first content position, the set of elements is a first set of elements, the set of user interactions is a first set of user interactions, the time period is a first time period, and the action is a first action, and
wherein the one or more instructions, when executed by the one or more processors, further cause the device to:
detect a movement event associated with changing the content that is positioned within the viewpoint region to changed content that is positioned within the viewpoint region;
track a second content position,
wherein the second content position is associated with a position of the changed content that is positioned within the viewpoint region;
identify, based on the second content position, a second set of elements that is positioned within the viewpoint region,
wherein the second set of elements is associated with the changed content that is positioned within the viewpoint region;
detect a second set of user interactions associated with the second set of elements that is positioned within the viewpoint region;
determine a second time period that the changed content that is positioned within the viewpoint region remains positioned within the viewpoint region; and
perform a second action related to providing the contextual assistance to the user based on at least one of:
the first set of elements,
the first set of user interactions,
the first time period,
the second set of elements,
the second set of user interactions, or
the second time period.

* * * * *